United States Patent [19]

Allerton

[11] Patent Number: 5,190,415
[45] Date of Patent: Mar. 2, 1993

[54] FLOW INDUCED FEED COLLECTOR AND TRANSPORTER APPARATUS

[75] Inventor: Girten O. Allerton, Mocksville, N.C.

[73] Assignee: Ingersoll-Rand Company, Woodcliff Lake, N.J.

[21] Appl. No.: 754,509

[22] Filed: Sep. 3, 1991

[51] Int. Cl.$^5$ ............................................. B65G 53/58
[52] U.S. Cl. ........................................ 406/118; 406/94
[58] Field of Search ...................... 406/93, 94, 95, 145, 406/122, 118; 165/174

[56] References Cited

U.S. PATENT DOCUMENTS

| | | | |
|---|---|---|---|
| 568,445 | 9/1896 | Kennedy | 406/94 X |
| 1,210,265 | 12/1916 | Bezvoda | 165/174 |
| 1,908,578 | 5/1933 | Vawter | 406/94 |
| 2,138,187 | 11/1938 | McElgin | 165/174 |
| 2,518,514 | 8/1950 | Anderson | 406/118 |
| 2,750,232 | 6/1956 | Szantay et al. | 138/118 |
| 2,858,165 | 10/1958 | Oliver | 406/118 |
| 3,514,905 | 6/1970 | King et al. | 406/118 X |
| 4,561,808 | 12/1985 | Spaulding et al. | 406/118 |
| 4,902,173 | 2/1990 | Hendee et al. | 406/145 |
| 5,018,910 | 5/1991 | Weiss | 406/122 X |

FOREIGN PATENT DOCUMENTS

| | | | |
|---|---|---|---|
| 114624 | 1/1942 | Australia | 165/174 |
| 2230953 | 12/1974 | France | 165/174 |
| 689680 | 4/1953 | United Kingdom | 406/94 |

Primary Examiner—Dennis H. Pedder
Assistant Examiner—Gary C. Hoge
Attorney, Agent, or Firm—Glenn B. Foster; James R. Bell

[57] ABSTRACT

An apparatus includes a tube having an inlet and an outlet. A plurality of apertures are spaced along a wall of the tube. Flow inducers are applied to the inlet for distributing the flow between the plurality of apertures. The flow inducers may include at least one venturi portion located within the tube. The tube is typically used to remove material contained within a hopper wherein the angle of a collection face, of the hopper, may be reduced and still effectively remove all the material applied to the collection face.

9 Claims, 3 Drawing Sheets

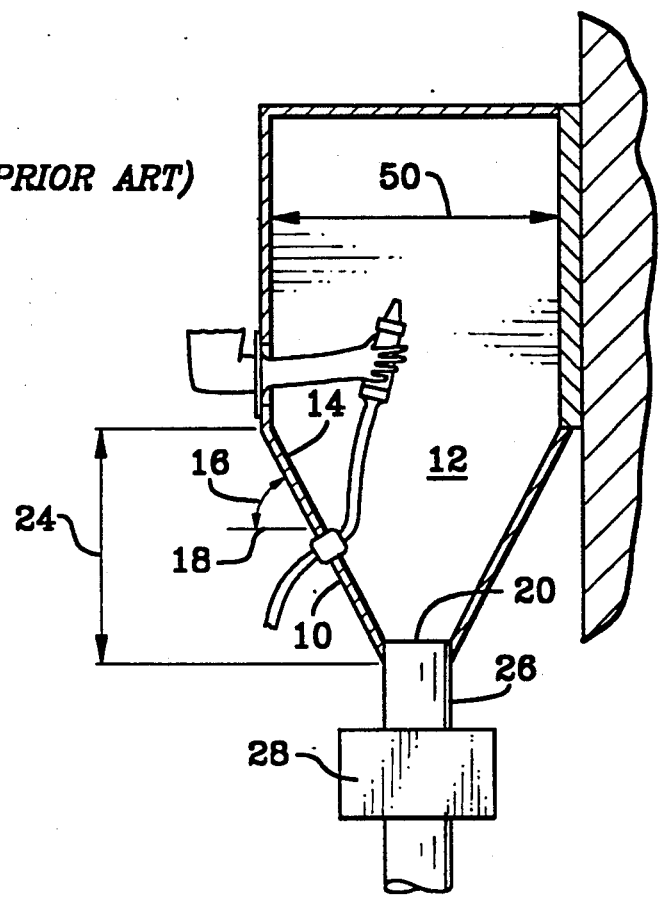

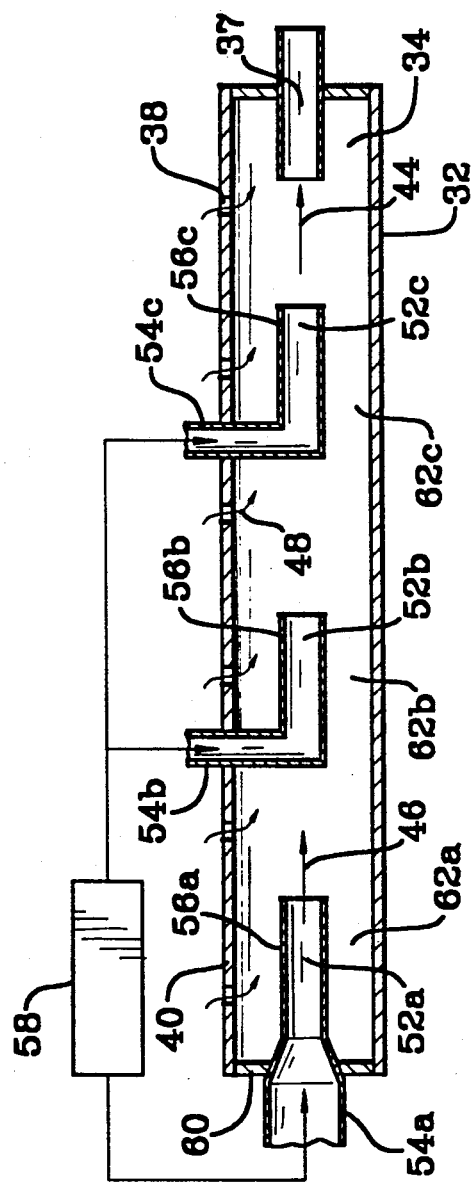
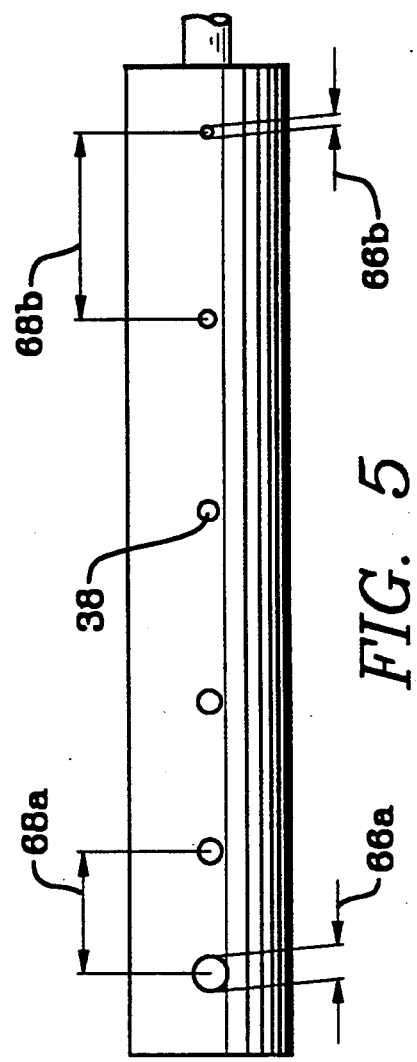

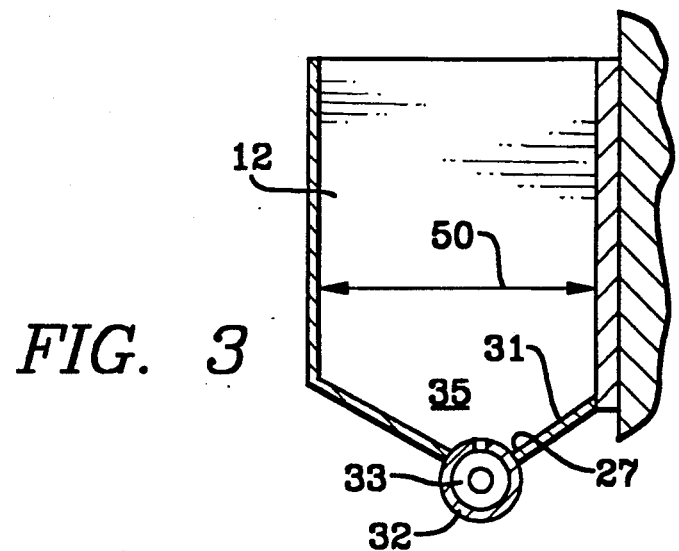
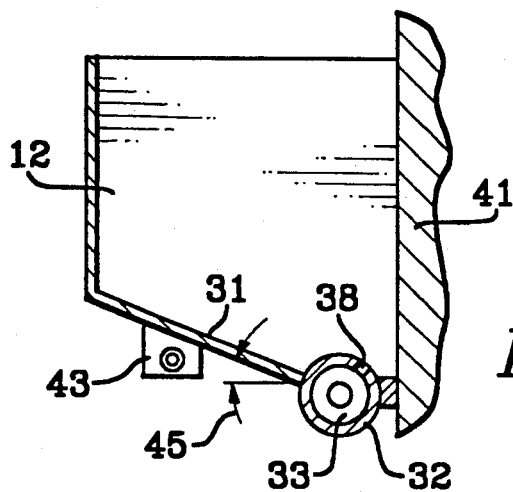
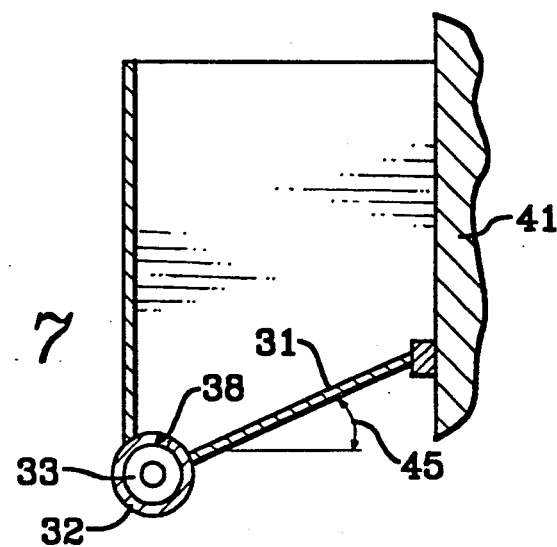

FLOW INDUCED FEED COLLECTOR AND TRANSPORTER APPARATUS

BACKGROUND OF THE INVENTION

This invention relates generally to hoppers and more particularly to flow induced feed collectors and transporters for hoppers.

Present hoppers are configured wherein material contained within the hopper drop through the feed outlet under the force of gravity. Under this configuration, the hopper walls must be angled sufficiently to permit this gravity induced flow. This configuration requires considerable hopper height, which adds to the necessary material to produce the hopper.

In hoppers feeding into a discharge tube of a considerable length, difficulty is found designing a suction system which provides even suction along the entire length of the tube. Typically, the portion of the tube which is closest to the suction outlet portion of the tube has the greatest suction compared to those portions removed from the suction outlet.

If the tube is extremely long, there may not even be any suction of those portions of the walls very far distant from the suction outlet. The situation arises where either too much pressure exists at the suction inlet, under which circumstances energy is wasted, or insufficient energy exists at portions of the tube distant from the suction inlet.

The foregoing illustrates limitations known to exist in present hopper feed systems. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing an apparatus including a tube having an inlet and an outlet. A plurality of apertures are spaced along a wall of the tube. Flow inducers are applied to the inlet for distributing the flow between the plurality of apertures.

The foregoing and other aspects will become apparent from the following detailed description of the invention when considered in conjunction with the accompanying drawing figures.

BRIEF DESCRIPTION OF THE DRAWING FIGURES

FIG. 1 is a cross sectional view illustrating an embodiment of hopper and associated outlet of the prior art;

FIG. 2 is a cross sectional side view illustrating an embodiment of hopper and outlet feed of the present invention;

FIG. 3 is a cross sectional view, as taken along section lines 3—3 in FIG. 2, illustrating the flow induced feed collector and transporter portion, as well as the lower portion of the collection face of FIG. 2;

FIG. 4 is a cross sectional longitudinal view illustrating a second embodiment of flow induced feed collector and transporter of the present invention;

FIG. 5 is a top view of the longitudinally extending tube 32 of the present invention, wherein apertures of varying sizes and spacing are disposed along the longitudinal length of the tube to regulate the flow along the length of the tube;

FIG. 6 is a view similar to FIG. 3 of an alternate embodiment of hopper and outlet feed of the present invention; and FIG. 7 is a view similar to FIG. 6 of yet another alternate embodiment of hopper and outlet feed device of the present invention.

DETAILED DESCRIPTION

Elements which perform identical functions in different embodiments are provided with identical reference characters.

A hopper shown generally as 10 includes an interior portion 12. The hopper 10 of the prior art, illustrated in FIG. 1, includes gravity feed walls 14 which are angled at an angle 16 from horizontal 18. The angle 16 is sufficient wherein material introduced into the interior portion will slide down the gravity feed walls 14 solely under the influence of gravity to an outlet.

Angling the gravity feed walls 14 as much as in the prior art, however, requires that the height 24 of the gravity feed wall portion of the hopper 10 be large. For certain applications, it may be desired to reduce the height of the gravity feed wall portion 24 of the hopper to reduce the size, bulkiness or weight of the hopper.

A suction conduit 26 is located between the outlet 20 and a suction transport device 28. The suction transport device provides motive force to propel material within the suction conduit 26 away from the hopper 10.

The hopper 10 and flow induced feed collection and transport portion 30 of the present invention is illustrated generally in FIGS. 2 and 3. The flow induced feed collection and transport portion 30 includes a longitudinally extending tube 32. The tube 32 defined an internal area 33 and an external area 35.

The internal area 33 includes a first portion 34 which is adjacent to the outlet 37. Fluid is supplied at a second portion 36 of the tube 32 through inlet 39 which is remote from the outlet 37. The outlet 37 is in fluid communication with suction transport device 28 through suction conduit 26.

Apertures 38 are formed in a radial wall 40 of the tube 32 at a location in communication with the interior portion 12. The apertures are spaced along the length of the tube 32 wherein material can be removed across the entire width 42 of the hopper 10.

The hopper has a collection face 31 which includes a longitudinally extending base portion 27 which is affixed to the tube 32. Material deposited on the collection face is displaced to the induced flow feed collection and transport portion 30 under the combined influences of gravity and fluid flow.

The hopper 10 may be formed using a single collection face 31 and a portion of a worksurface 41 as illustrated in FIGS. 6 and 7. In FIG. 6, the tube is adjacent the worksurface and clearly follows the contour thereof. In this manner, material which collects on the collection face will gravitate towards the tube 32. A vibrator 43 of a type well known in the art is applied to the collection face 31 to further assist in the material descending the collection face to the tube 32.

In the FIG. 7 embodiment, the collection face is disposed closely adjacent the worksurface 41, and angled such that material which falls on the collection face will gravitate away from the worksurface 41 towards the tube 32. In this embodiment which has no vibrator, and angle of repose 45 of the collection face 31 has to be greater than in the FIG. 6 embodiment, which has a vibrator to assist in material transport on the collection face.

There may be a plurality of collection faces 31 which angle towards the tube 32 to form the hopper. The collection faces may assume various curved configurations to accommodate differing contoured worksurfaces.

The dimension and number of the apertures, the amount of fluid applied to the second portion 36 (second fluid flow 46) of the tube and the amount of fluid removed from the first portion 34 (first fluid flow 44) must be interrelated. It is necessary that a first fluid flow 44 exceeds the second fluid flow 46. Fluid in the second fluid flow 46 will be forced to flow along the entire length of the tube 32 by a suction created by the first fluid flow 44. The difference in flow between the first fluid flow 44 and the second fluid flow 46 is made up by fluid passing through apertures 38.

A third fluid flow 48 will thereby be created from the interior portion 12 to the first portion 34 of the tube 32 via apertures 38. This third fluid flow 48 permits a decrease of the angle 16 of a collection face 31 of the hopper 10 necessary for material to slide to the flow induced collection and transport portion 30 of the hopper.

This decrease in hopper height 24 for a given hopper width is especially useful where size and weight of the hopper is critical. For example, in enclosed portable sandblasting applications, which are being required by more regulations, a hopper with a minimal height is extremely useful.

Size of the enclosure and weight of the enclosure is an essential consideration in determining which applications the sandblasting enclosure is appropriate for. In this disclosure, the terms sandblasting, abrasive blasting and waterjet cutting and cleaning are used interchangeably and inclusively.

FIG. 4 illustrates an induced flow collection and transport portion 30 with a plurality of fluid inlets 52a, 52b and 52c which correspond to the inlet 39 of the FIG. 3 embodiment. Fluid inlet 52a enters from an end wall 60 of the tube while fluid inlets 52b and 52c enter through the radial wall 40 of the tube 32. The fluid inlets represents one embodiment of flow boosting means.

The sum of flow entering all of the fluid inlets 52a, 52b and 52c must be less than the first fluid flow 44 exiting the tube 32. The differential is made up of fluid entering through the apertures 38.

Each fluid inlet 52a, 52b and 52c contain a connector portion 54a, 54b and 54c and a venturi portion 56a, 56b and 56c, respectively. The venturi portions 56a, 56b and 56c are virtually identical in each fluid inlet. The connector portion 54a communicates a fluid supply 58 through the end wall 60 to venturi portion 56a. The connector portions 54a, 54b communicates the fluid supply 58, through radial wall 40, to venturi portion 56b, 56c.

A venturi is created in spaces 62a, 62b and 62c formed between the radial wall 40 and the venturi portions 56a, 56b and 56c respectively. This venturi configuration ensures that less differential between the first fluid flow 44 and the second fluid flow 46 is necessary to produce an identical third fluid flow.

Another way to describe the action of the last paragraph, assuming that virtually all fluid passing through the apertures 38 will exit the tube at the first portion 34, is that the first fluid flow 44 is sufficient to require a second fluid flow 46 and a third fluid flow 44 to be directed to combine and form the first fluid flow.

A given length of tube 32 may be too long for only a single venturi portion 56a to produce adequate third fluid flow 48 through all of the apertures 38 along the entire length of the tube. Therefore, the plurality of venturi portions 56a, 56b, 56c may be required to be placed along the length of the hopper as illustrated in FIG. 4 to ensure constant and steady flow along the entire length.

The above described fluid inlet 54a, 54b, 54c configuration regulates air flow through the apertures 38 along the longitudinal length of the tube 32. It is further anticipated that the dimensions and spacing of the apertures may be irregular to further regulate the air flow through the apertures.

Generally, the greater the distance from the aperture 38 to the outlet 37, the greater a dimension of the aperture 66a, 66b should be and the less the spacing 68a, 68b between the apertures should be. Varying the sizing and spacing of the apertures, illustrated in FIG. 5, combined with effective use of the fluid inlets 52a, 52b, 52c will permit regulation of fluid flow through the apertures 38 along the length thereof.

While this invention has been illustrated and described in accordance with a preferred embodiment, it is recognized that other variations and changes may be made therein without departing from the invention as set forth in the claims.

Having described the invention, what is claimed is:

1. An apparatus comprising:
   a tube having an inlet, an outlet, and an internal area;
   suction means being in fluid communication with said outlet for inducing a flow through said tube;
   a plurality of aperture means spaced along a wall of the tube for introducing a particulate material to the internal area; and
   a plurality of flow boosting means, applied along the length of said tube between the inlet and the outlet, for maintaining the velocity of said flow throughout the length of said tube whereby said particulate material is conveyed a greater distance through said pipe than is possible without the flow boosting means.

2. The apparatus as described in claim 1, wherein the flow boosting means comprises:
   at least one venturi portion.

3. The apparatus as described in claim 2, wherein a venturi is created between the venturi portion and the tube.

4. The apparatus as described in claim 1, further comprising:
   a hopper defining an interior portion, the interior portion is in fluid communication with an internal area of the tube via said apertures.

5. The apparatus as described in claim 4, wherein the hopper is configured to permit collecting of particulate material from abrasive blasting applications.

6. The apparatus as described in claim 1, wherein the spacing between the apertures is varied along the length of the tube.

7. The apparatus as described in claim 1, wherein the fluid is a compressible fluid.

8. The apparatus as described in claim 1, wherein the particulate material contains abrasives.

9. The material as described in claim 1, wherein the particulate material contains remnants from abrasive blasting.

* * * * *